United States Patent [19]

Yamagata

[11] Patent Number: 5,099,339
[45] Date of Patent: Mar. 24, 1992

[54] VIDEO SIGNAL REPRODUCING APPARATUS AND TRACK TRANSFER METHOD

[75] Inventor: Shigeo Yamagata, Kanagawa, Japan

[73] Assignee: Canon Kabushiki Kaisha, Tokyo, Japan

[21] Appl. No.: 598,802

[22] Filed: Oct. 15, 1990

Related U.S. Application Data

[63] Continuation of Ser. No. 438,951, Nov. 17, 1989, abandoned, which is a continuation of Ser. No. 57,295, May 12, 1987, abandoned.

[30] Foreign Application Priority Data

May 16, 1986 [JP] Japan .................. 61-112060

[51] Int. Cl.$^5$ ............................................. H04N 5/781
[52] U.S. Cl. ................................................. 358/342
[58] Field of Search ............... 358/342, 907, 319, 340; 360/10.1, 10.3, 64, 37.1, 70

[56] References Cited

U.S. PATENT DOCUMENTS

| | | | |
|---|---|---|---|
| 3,705,262 | 12/1972 | Kennedy et al. | 358/342 |
| 3,796,825 | 3/1974 | Redlich et al. | 358/342 |
| 3,854,015 | 12/1974 | Janssen | 358/342 |
| 3,939,302 | 2/1976 | Kihara | 358/342 |
| 3,973,080 | 8/1976 | Dickopp et al. | 358/907 |
| 4,057,832 | 11/1977 | Kappert | 358/342 |
| 4,142,209 | 2/1979 | Hedlund et al. | 358/342 |
| 4,203,138 | 5/1980 | Elenbaas | 360/10.3 |
| 4,236,232 | 11/1980 | Jansen et al. | 369/32 |
| 4,245,247 | 1/1981 | Fike et al. | 358/342 |
| 4,257,073 | 3/1981 | Tatami | 360/10.3 |
| 4,361,849 | 11/1982 | Bolger | 358/342 |
| 4,414,584 | 11/1983 | Kurata | 358/342 |
| 4,417,285 | 11/1983 | Mes | 360/10.1 |
| 4,425,587 | 1/1984 | Kurata | 358/342 |
| 4,488,278 | 12/1984 | Dieterich | 358/342 |

Primary Examiner—Donald McElheny, Jr.
Attorney, Agent, or Firm—Robin, Blecker, Daley & Driscoll

[57] ABSTRACT

A video signal reproducing apparatus comprising a head for reproducing video signals recorded in plural tracks accompanied with guard bands on a recording medium is disclosed, wherein the head is transferred from track to track so that the head is positioned substantially on the guard band in the blanking period of the video signals and that any noise produced during the track transfer is thus minimized.

11 Claims, 5 Drawing Sheets

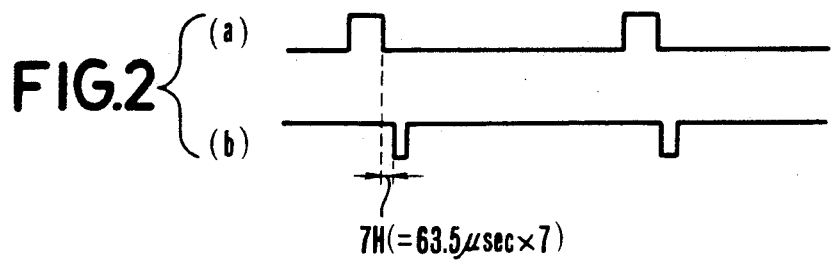
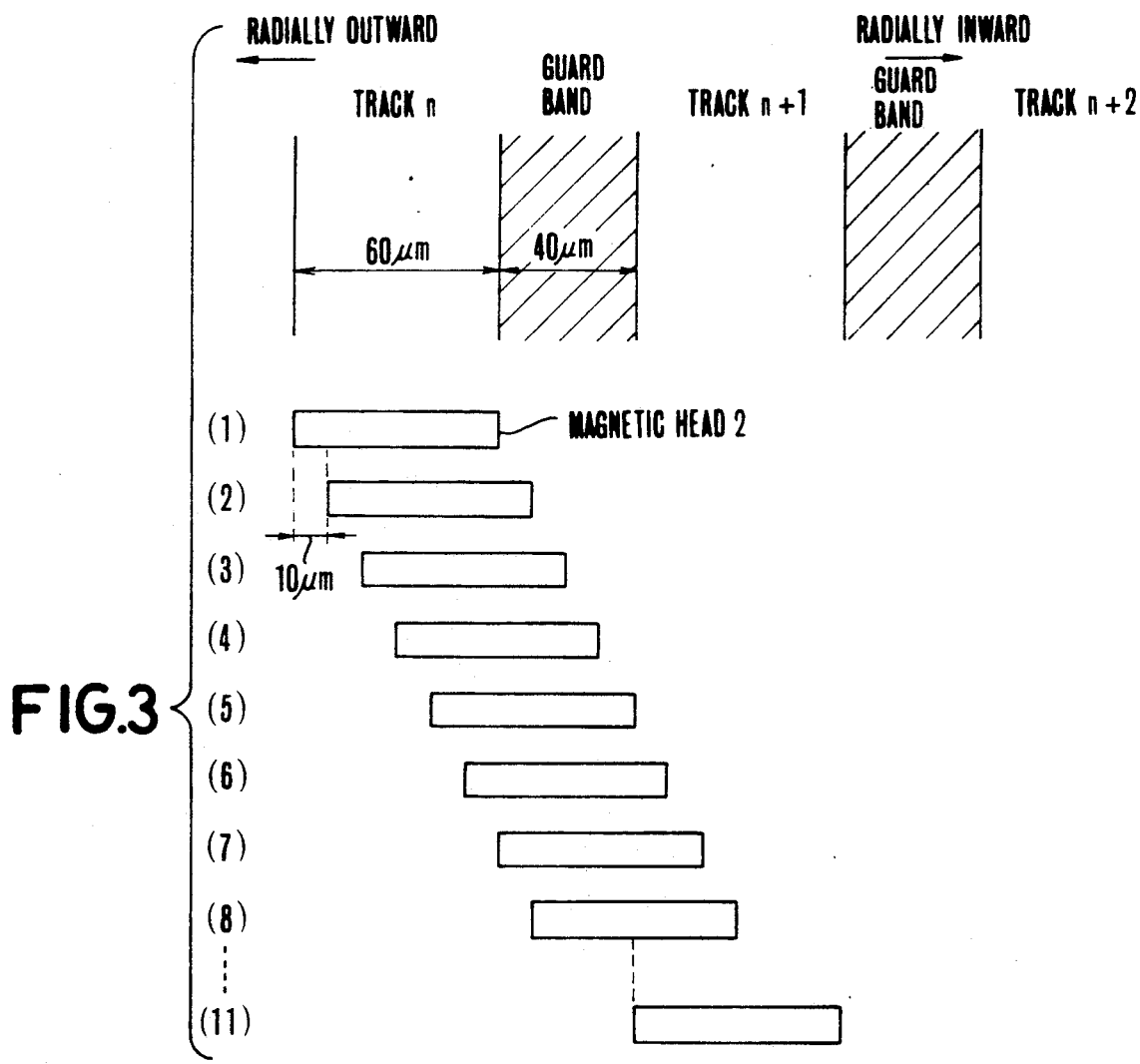

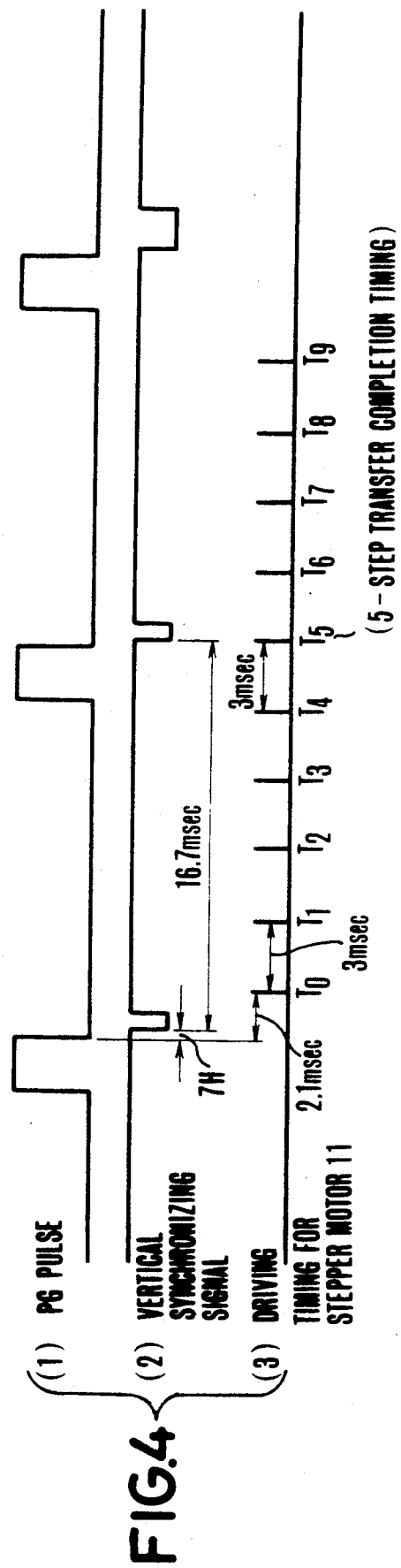

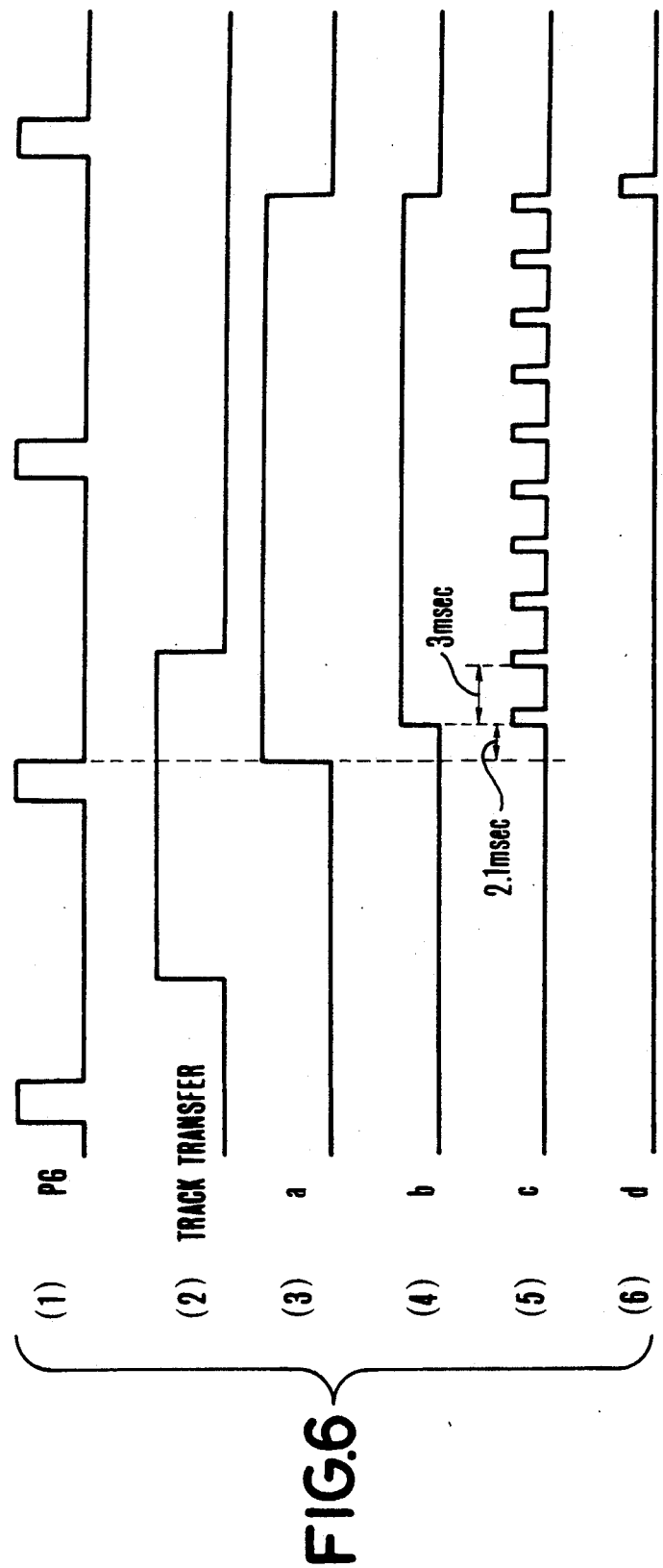

VIDEO SIGNAL REPRODUCING APPARATUS AND TRACK TRANSFER METHOD

This application is a continuation of application Ser. No. 438,951, filed Nov. 17, 1989 now abandoned, which is a continuation of application Ser. No. 057,295, filed May 12, 1987, now also abandoned.

BACKGROUND OF THE INVENTION

1. Field of the Invention

The present invention relates to a video signal reproducing apparatus, particularly an apparatus that can reproduce selectively the information stored on any of plural tracks formed on a recording medium, for example, a magnetic sheet, and a track transfer method used in the apparatus.

2. Description of the Related Art

To move a reproducing head from a track to the adjacent track, the conventional apparatuses of this type have used, for example, a stepper motor to repeat the movement intermittently many times. Each of these apparatuses has been provided with guard bands inserted between tracks on a magnetic sheet used as a recording medium. Therefore, the reproducing head has not been transferred from a track to the adjacent track without passing across the guard band.

In each of these apparatuses, however, the moving part of the head used to select any track storing the information to be reproduced by the head could not provide any sufficiently rapid operation, for example, operation as rapid as it could move from a track to the adjacent track during the video signal blanking period. Consequently, a considerably wide noise had been produced in the reproduced video signal when the head was moved from a track to the adjacent track. This noise that was produced when the head was moved from track to track presented the disadvantage that it produced a great disturbance in the reproduced video signals to be monitored during the rapid movement of the head, and consequently deteriorated significantly the quality of the reproduced image.

SUMMARY OF THE INVENTION

An object of the present invention is to eliminate this disadvantage, that is, to reduce the influence of the noise produced when the head is moved across the guard band.

Another object of the present invention is to provide a video signal reproducing apparatus that can prevent any detrimental noise from appearing on a monitor screen during the movement of the head from track to track (track transfer).

According to a preferred embodiment of the present invention is disclosed a video signal recording apparatus comprising a head for reproducing video signals recorded on plural tracks between guard bands on a recording medium, wherein the head is moved from track to track so that the head will be able to pass across the guard band substantially during the video signal blanking period.

These and other features and objects of the present invention will be better understood by reading the description of a preferred embodiment according to the present invention given below on referring to the drawings annexed hereto.

BRIEF DESCRIPTION OF THE DRAWINGS

FIG. 2 is a time chart showing the relationship between the output of the wave shaping circuit 7 and the vertical synchronizing signal for video signals.

FIG. 3 shows the positional relationship between the magnetic head 2 and the tracks and guard bands on the magnetic sheet 1.

FIG. 4 is a time chart illustrating the operation of the embodiment as shown in FIG. 1.

FIG. 6 is a timing chart illustrating the operations of parts in the driver 10 as shown in FIG. 5.

DETAILED DESCRIPTION OF THE PREFERRED EMBODIMENT

Figure 1:
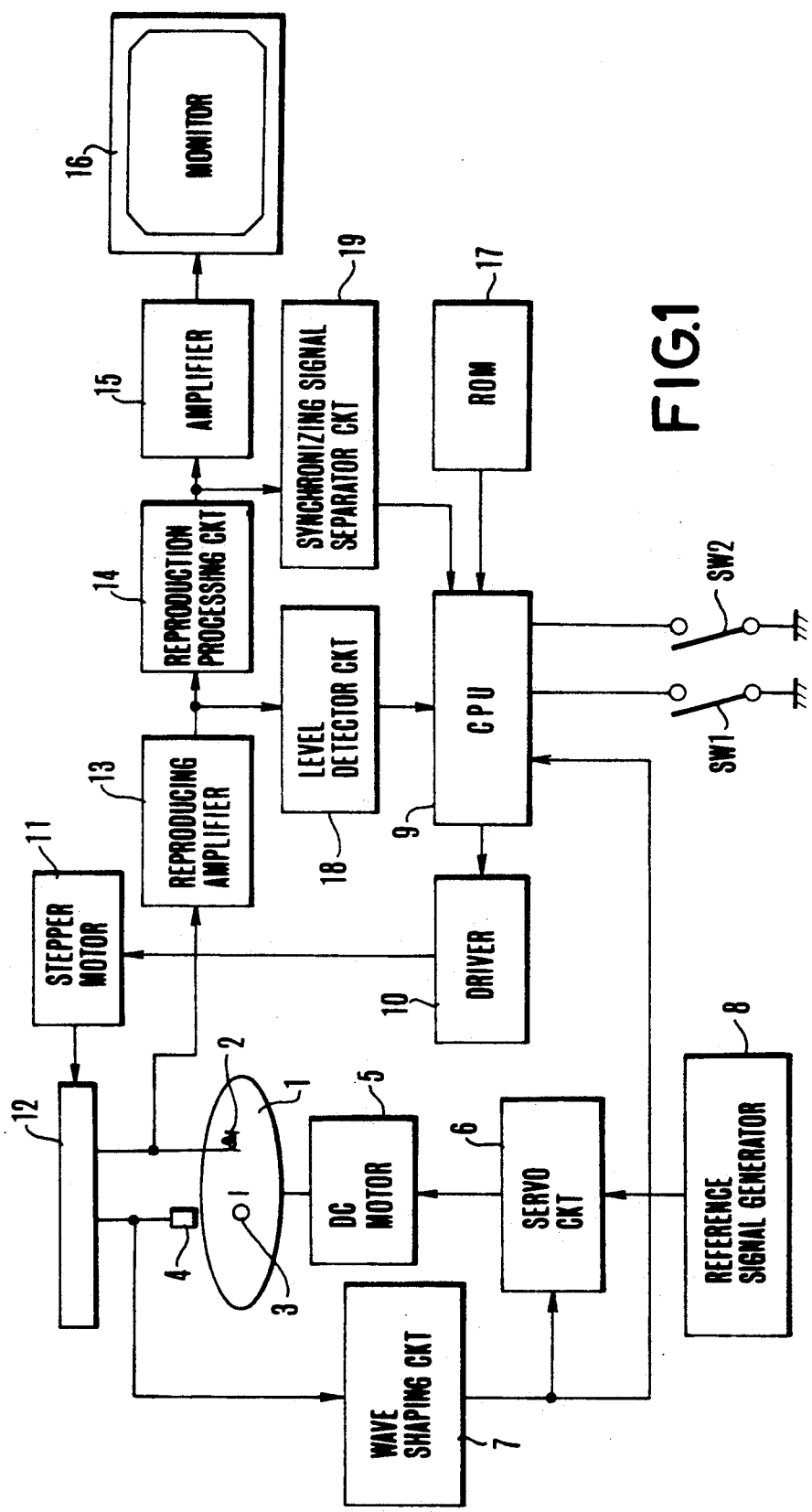
FIG. 1 is a block diagram showing an embodiment of the present invention.

FIG. 1 is a block diagram showing a preferred embodiment according to the present invention. In FIG. 1, a magnetic sheet 1 is the medium in which video signals are recorded. The magnetic sheet 1 has plural tracks formed in concentric circles between guard bands of constant width. A magnetic head 2 reads signals from the magnetic sheet 1. A magnetizable piece 3 is also mounted on the magnetic sheet 1. A PG coil 4 is provided to produce a signal in the timing set by the position of the magnetizable piece 3 on the rotation of the magnetic sheet 1. A DC motor 5 is used to rotate the magnetic sheet 1. A servo circuit 6 is provided to rotate the DC motor 5 at a constant speed. A wave shaping circuit 7 is used to shape the output signal from the PG coil 4. A reference signal generator 8 produces a reference signal to rotate the DC motor 5 at a constant speed and delivers it to the servo circuit 6. A control circuit (CPU) 9 is used to control the whole system. A driver 10 is used for the stepper motor 11 which is described hereinafter. The rotation of the stepper motor 11 driven by the driver 10 is transmitted to a head moving mechanism 12 to move the magnetic head 2 radially on the magnetic sheet 1. The output signal of the magnetic head 2 is supplied to a reproducing amplifier 13. The output signal of the amplifier 13 is supplied to a reproduction processing circuit 14. A video amplifier 15 receives the output signal of the reproduction processing circuit 14 and delivers a video signal to a monitor 16. A ROM 17 stores the code used to operate the CPU 9. A level detector circuit 18 detects the output level of the reproducing amplifier 13 and allows control of the magnetic head 2 for its accurate positioning on a track. A synchronizing signal separator circuit 19 is used to separate the synchronizing signal from the output of the reproduction processing circuit 14. SW1 is a track UP switch used to move the magnetic head 2 on the magnetic sheet 1 in the inward and radial direction. SW2 is a track DOWN switch used to move the magnetic head in the outward and radial direction.

The operation of the embodiment according to the present invention will be detailed below.

When the magnetic sheet 1, wherein video signals are stored on the predetermined tracks, is driven at a constant speed by the DC motor 5 controlled by the servo circuit 6, the magnetic head 2 reads the video signals out of the magnetic sheet 1 and supplies them to the reproducing amplifier 13. The output signal of the reproducing amplifier 13 is applied to the reproduction processing circuit 14, in which a demodulator produces the reproduced video signal. The output signal of the processing circuit 14 is then supplied to the amplifier 15. The output of the amplifier 15 drives the monitor 16 on which the reproduced video signal is monitored. In this case, the magnetic head 2 is accurately positioned on the track storing the video signal read out of the magnetic sheet 1. Particularly, the magnetic head 2 is automatically placed by the control of the CPU 9 in the access position where the output of the level detector circuit 18 is the maximum, so that the center of the magnetic head 2 is aligned with the center line of the track n as shown in FIG. 3 (Position (1)). In FIG. 3, n, n+1 and n+2 indicate the tracks formed in the predetermined position respectively on the magnetic sheet 1. The hatched zones show guard bands respectively. The track is 60 μm wide, the guard band is 40 μm wide and the magnetic head is 60 μm wide.

The operation of the servo circuit 6 will be described below.

A pulse signal produced by the magnetizable piece 3 and the PG coil 4 every rotation of the magnetic sheet 1 is shaped by the wave shaping circuit 7 and supplied to the servo circuit 6. The servo circuit 6 detects the rotations per minute of the magnetic sheet 1, and controls the magnetic sheet 1 to be rotated at the phase and the constant speed as predetermined by comparing the detected rotations per minute with the output of the reference signal generator 8 in frequency and phase. In more detail, the servo circuit 6 controls the falling phase of the signal produced by the wave shaping circuit 7 and the phase of the signal supplied by the reference signal generator 8 so that they occur at a predetermined time difference (7 H in this case). In addition, the servo circuit 6 receives a vertical synchronizing signal for the video signal recorded on the magnetic sheet 1 as a reference signal during recording, so that the recording is performed with the magnetic sheet 1 being rotated in the same manner as described above. Therefore, the phase of the vertical synchronizing signal for the video signal reproduced from the sheet 1 and the falling phase of the signal produced by the wave shaping circuit 7 occur at a predetermined time difference of 7 H. FIG. 2 is a time chart showing the relationship between the output of the wave shaping circuit 7 and the synchronizing signal for the video signal. In this figure, (a) is a pulse signal delivered by the PG coil 7 and shaped by the wave shaping circuit 7, and (b) is a component of the vertical synchronizing signal for the video signal delivered by the reproduction processing circuit 14. In short, the servo circuit 6 controls the signals as shown in FIG. 2 so that the falling edge of the signal (a) will be set 7 H before the front edge of the vertical synchronizing signal (b).

A field of video signals is recorded on a track on the magnetic sheet 1. A still picture is obtained by reproducing the video signals in the field in turn. In reproducing the video signals in the field in turn, the discontinuity equivalent to 0.5 the horizontal period of the horizontal synchronizing signal is compensated for by means of the delay line of 0.5 H in the reproduction processing circuit 14 so that any skew will not appear on the monitor.

The movement of the magnetic head 2 provided by turning on the track UP switch SW1 will be detailed by referring to FIG. 3. The conditions wherein the magnetic head 2 is reproducing the information on the track n is as shown by (1) in FIG. 3. When the switch SW1 is turned on, the magnetic head 2 starts to move in the radially inward direction. Then, the CPU 9 detects the fact that the switch SW1 is turned on, and delivers a pulse to the driver 10, which rotates the stepper motor 11 by one step. When the driver 10 receives this pulse, the driver 10 operates the stepper motor 11. Then, the rotation of the stepper motor 11 is transmitted to the head moving mechanism 12, which moves the magnetic head 2 by a distance equivalent to one step in the radially inward direction. The position of the magnetic head 2 is as shown by (2) in FIG. 3. The head movement per step is set at 10 μm by the head moving mechanism 12 in this embodiment. Since the width of a track+a guard band is 60 μm+40 μm=100 μm as described above, the movement from track to track is accomplished by 10 steps of the stepper motor 11. When 5 pulses are delivered by the CPU 9 sequentially, as described above, the head 2 is positioned on the guard band adjacent to the track n, as shown by (6) in FIG. 3. In this head position, the reproduced video signal is almost fully constituted by a noise component that produces a noise on the picture displayed on the monitor 16. When the 10th pulse is delivered by the CPU 9, the magnetic head 2 completes the movement to the track n+1 (as shown by (11) in FIG. 3). While the switch SW1 is set in ON, the magnetic head 2 may be then moved from the track n+1 to the track n+2 and further to the most inward track by repeating the step operation many times. When the track DOWN switch SW2 is turned on, the magnetic head 2 moves in the radially outward direction. The head 2 repeats its outward movement to the most outward track as long as the switch SW2 is set in ON.

The pulse width which is used to drive the stepper motor 11 by one step is preset at the minimum value, for example, 3 msec, considering the self-start frequency of the stepper motor 11 and the torque to drive the head moving mechanism 12. Thus, the CPU 9 supplies drive pulses to the driver 10 so that the magnetic head 2 will be moved by one step for every period of 3 msec. In other terms, the magnetic head 2 can move from a track to the adjacent track with 10 pulses of 3 msec, that is, for 30 msec.

The timing used to start the head movement will be described below by using FIG. 4.

According to the present invention, the timing for starting the head movement is preset so that the time when the magnetic head 2 reaches the position where the video signal reproduced by the head 2 contains the highest noise, that is, when the head 2 has been moved by 5 steps will be coincident with the vertical blanking period of the video signal. In FIG. 4, (1) is the PG pulse as described above, (2) is the vertical synchronizing signal for the reproduced video signal and (3) shows the timing in which a sequence of driving pulses is applied by the driver 10 to the stepper motor 11, that is, the timing in which the magnetic head 2 is moved from track to track. In this embodiment, a driving pulse is applied to the magnetic head 2 15 msec before the start point (falling edge) of the vertical synchronizing signal to start the head 2 moving, so that the time $T_5$ when the magnetic head 2 is positioned on the adjacent guard band after having moved by 5 steps will be coincident with the start point of the vertical synchronizing signal as shown in FIG. 4. To move the magnetic head 2 in this timing, the CPU 9 detects the falling edge of the PG pulse (as shown by (1) in FIG. 4) and delivers to the driver 10 a pulse with which the driver 10 will start the magnetic head 2 moving 2.1 msec (=16.7 msec−3 msec×5+63.5 μsec×7) after the falling edge of the PG pulse. The time when the CPU 9 delivers the pulse is as shown by $T_0$ in FIG. 4. If the CPU 9 delivers 10 pulses $T_1, T_2, \ldots T_9$ at intervals of 3 msec subsequently, the time when the magnetic head 2 is positioned on each guard band will be able to coincide with the vertical blanking period. More concretely, the highest noise appears in the lowest part of the reproduction screen or outside the effective screen of the monitor 16, when the magnetic head 2 is positioned in the highest-noise zone or the guard band. The noise produced in this part of the screen on the monitor 16 during the head movement can be easily eliminated or reduced. However, it is possible only if the magnetic head 2 can access accurately the locations of the track in which the information is stored and if the guard band is accurately 40 μm wide. If the width of the guard band is on the level of ±10 μm, a noise will be produced at the time $T_4$ or $T_6$ as shown in FIG. 4. Even if so, however, the noise will appear outside the effective screen of the monitor 16. It is so negligible or insignificant that the rapid movement of the magnetic head can be provided effectively to reproduce the video signals stored by the magnetic sheet.

The case in which there is a phase deviation between adjacent tracks in the positions where vertical synchronizing signals are recorded will be described below. In this case, a noise is produced at the time $T_5$ as shown in FIG. 4, and a skew is produced in the upper part of the monitor screen at the time $T_6$ when the reproduction of the information stored on the next track is started. To prevent such a noise and skew, the magnetic head 2 may be started 3 msec earlier than the head starting time as described above. By doing so, the guard band is accessed at the time $T_4$ to produce a skew at the time $T_5$ if there is no phase deviation between adjacent tracks. However, this skew is produced in the vertical blanking period so that no skew appears on the effective screen of the monitor 16.

The operations as described above are implemented by the CPU 9 according to a program stored in the ROM 17. Of these operations, those involving a hardware will be described below on referring to FIG. 5.

Figure 5:
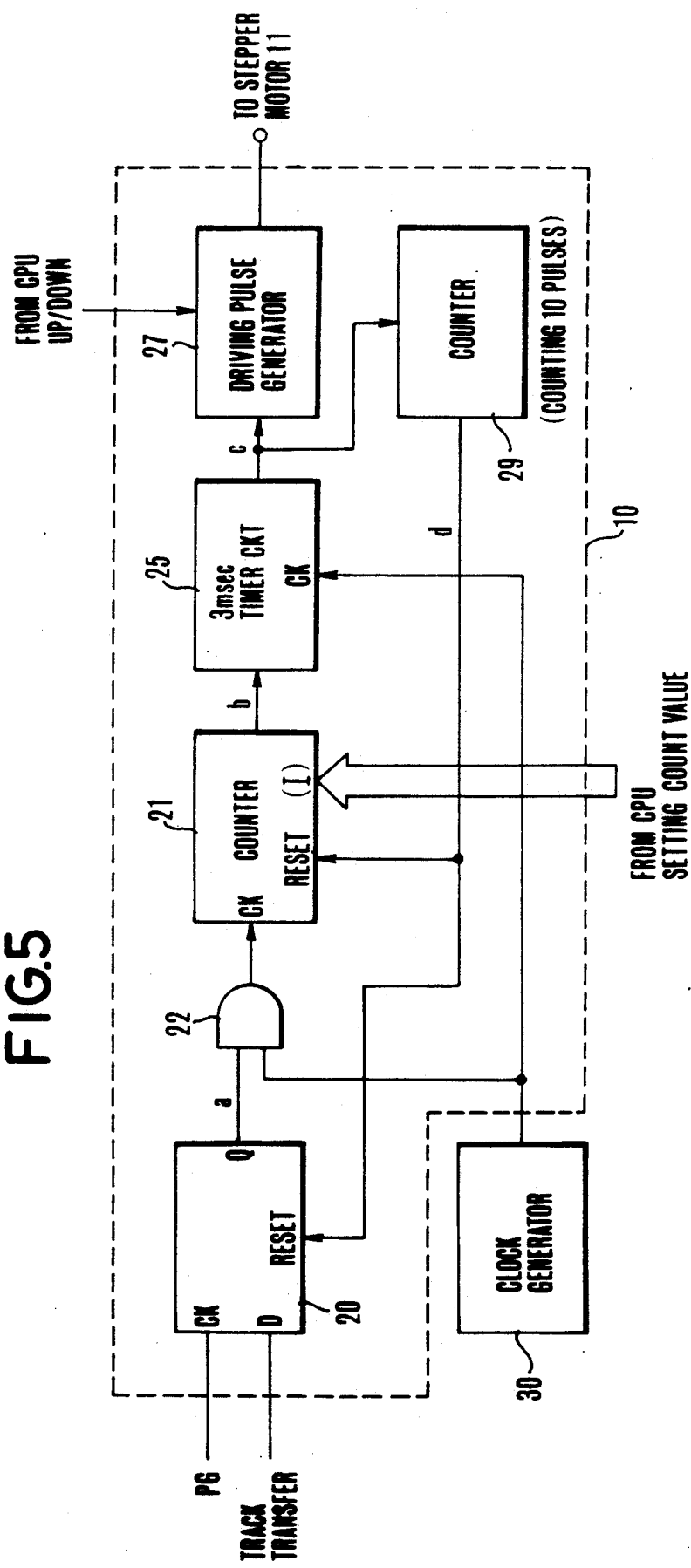
FIG. 5 is a block diagram showing the configuration of the driver 10 as shown in FIG. 1.

The hardware is provided in the driver 10 as shown in FIG. 1. FIG. 5 is a block diagram showing the configuration of the driver 10. In FIG. 5, a D-flip-flop (D-FF) 20 is triggered with the PG pulse supplied by the CPU 9 and latches the track transfer command pulse. This command pulse may be directly by the switch SW1 or SW2, or otherwise by the CPU 9. A programmable counter 21 clocks for the period equivalent to 2.1 msec as shown in FIG. 4. The counted value is preset by the CPU 9. An AND gate 22 provides the AND operation for the outputs of the clock generator 30 and D-FF 20. A timer circuit 25 produces pulses at intervals of 3 msec as shown in FIG. 4. A driving pulse generator 27 produces the pulse to drive the stepper motor 11, according to the command of the CPU 9 in the timing corresponding to the pulse supplied by the timer circuit 25. A counter 29 produces a pulse to reset the D-FF 20 after having counted 10 pulses supplied by the timer circuit 25. The clock generator 30 produces clocks to be supplied to the AND gate 22 and the 3 msec timer circuit 25.

The operation of the embodiment thus composed will be described below by referring to the time chart as shown in FIG. 6. In this figure, (1) is the waveform of PG pulse, (2) is that of the track transfer command pulse produced by means of the switch SW1 or SW2, and (3) to (6) show the waveforms of the signals "a" to "d" as shown in FIG. 5.

The track transfer command pulse produced is latched at the falling time of the PG pulse as shown by (1) in FIG. 6. To start the magnetic head 2 moving from track to track at this time, the counter 21 counts clocks produced by the clock generator 30 and delivers a signal as shown by "b" in FIG. 6, which is delayed by 2.1 msec with respect to the pulse "a". With this signal "b", the 3 msec timer circuit 25 starts to count in order to set the period of the track transfer command pulse, and produces pulses at intervals of 3 msec. In this pulse timing, the pulse generator 27 produces a pulse with which the driver 10 drives the stepper motor 11 in the track transfer direction as commanded by the CPU 23.

On the other hand, the counter 29 counts 10 pulses "c". Then, the counter 29 produces a pulse to reset the D-FF 20 and to stop the track transfer operation temporarily.

In this embodiment, it is possible to detect the position of any noise produced during the track transfer and the monitor viewing, in addition to the effects as described above, if the count value set in the programmable counter 21 is changed.

In the embodiments as described above, the head movement start timing is selected in reference to the PG pulse. However, the output of the reference signal generator 8 which is supplied to the servo circuit 6 may be used as the reference, or otherwise the vertical synchronizing signal for the reproduced video signals may be also used.

The timing in which the magnetic head 2 is not started in movement in a certain time after the falling of the PG pulse, but at the falling of the PG pulse, may be provided by controlling the stepped-transfer pulse period. The magnetic head 2 may be moved from track to track without using the stepper motor. If the head 2 is moved across the guard band at the maximum speed, the noise produced by the guard band may be minimized on the monitor 16.

In the embodiment as described above, the magnetic head 2 is movable. However, the head 2 may be fixed, while the recording medium is movable. The present invention may be applied to the video signal reproducing apparatus comprising such a head and recording medium.

The embodiment as described above, wherein such a head start timing is selected that the timing when the magnetic head passes across the guard band is coincident with the timing of the vertical synchronizing signal for the reproduced video signal, or the timing earlier by the period of 1 step, presents the advantages that the noise produced when the magnetic head passes across the guard band during the track transfer is negligibly reduced and that there is a smaller influence of any skew on the effective screen.

As it is described above, the present invention presents the advantage that any noise produced when the magnetic head passes over the guard band is negligibly reproduced, because the noise is produced in the blanking period of video signals.

What is claimed is:

1. In a video signal reproducing apparatus comprising a head for reproducing video signals recorded in plural tracks accompanied with guard bands on a recording medium, drive means for moving the recording medium and stepper means for displacing said heads with respect to said recording medium,
   (a) first means for sensing recording medium movement and generating an output signal indicative of a cycle of such movement;
   (b) second means for generating from video signals reproduced by said head an output signal indicative of the time of occurrence of the vertical synchronizing signal of said video signals; and
   (c) control means for controlling said driving means such that the first means output signal and the second means output signal maintain a predetermined phase difference, to displace said head with a delay of a predetermined time with respect to said first output signal or said vertical synchronizing signal while taking a time longer that at least one vertical blanking time, wherein said predetermined time is set such that said head is positioned near the guard band during a vertical blanking time of said video signal.

2. An apparatus according to claim 1, wherein said recording medium is disc-shaped.

3. An apparatus according to claim 2, wherein said plural tracks are formed in concentric circles on said disc-shaped recording medium.

4. An apparatus according to claim 1 wherein said recording medium includes a discernible mark thereon for indicating the rotational phase of said recording medium, said first means generating said first means output signal upon detection of said discernible mark.

5. An apparatus according to claim 4 wherein said control means effects operation of said stepper means at a point in time delayed by a preselected time period from said detection of said discernible mark.

6. In a method for controlling head displacement in a video signal reproducing apparatus comprising a head for reproducing video signals recorded in plural tracks accompanied with guard bands on a recording medium, drive means for moving the recording medium and stepper means for displacing said head with respect to said recording medium, in accordance with a track transfer command for such displacement of said head, the steps of:
   (a) detecting said track transfer command and deriving a synchronizing signal from video signals reproduced by said head; and
   (b) displacing said head with a delay of a predetermined time with respect to the synchronizing signal derived in response to said track transfer command, while taking a time longer that at least one vertical blanking period, wherein said predetermined time is set such that said head is positioned near a guard band during a vertical blanking period.

7. A method according to claim 6, wherein said step (a) includes:
   a) a substep of detecting said track transfer command; and
   b) a substep of detecting said synchronizing signal subsequently to practice of said substep of detecting said track transfer command.

8. A method according to claim 6, wherein said blanking period is selected to be a vertical blanking period.

9. A method according to claim 6, wherein said recording medium is selected to be disc-shaped.

10. A method according to claim 9, wherein a plurality of concentric tracks are formed on said recording medium, and wherein one field of said video signals is recorded in each of said plurality of concentric tracks.

11. A method according to claim 6, wherein said steps (a) and (b) are practiced repetitively.

* * * * *